(12) United States Patent
Barbier et al.

(10) Patent No.: US 11,131,228 B2
(45) Date of Patent: Sep. 28, 2021

(54) METHOD FOR PREVENTING A RISK OF FREEZING IN A REDUCING-AGENT FEEDING DEVICE OF A SELECTIVE CATALYTIC REDUCTION SYSTEM

(71) Applicants: CONTINENTAL AUTOMOTIVE FRANCE, Toulouse (FR); CONTINENTAL AUTOMOTIVE GMBH, Hannover (DE)

(72) Inventors: Pascal Barbier, Tournefeuille (FR); Sylvain Sirop, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/645,187

(22) PCT Filed: Sep. 10, 2018

(86) PCT No.: PCT/FR2018/052200
§ 371 (c)(1),
(2) Date: Mar. 6, 2020

(87) PCT Pub. No.: WO2019/053361
PCT Pub. Date: Mar. 21, 2019

(65) Prior Publication Data
US 2020/0284178 A1    Sep. 10, 2020

(30) Foreign Application Priority Data
Sep. 12, 2017    (FR) ...................................... 1758392

(51) Int. Cl.
*F01N 3/20*    (2006.01)
*F01N 9/00*    (2006.01)

(52) U.S. Cl.
CPC ............... *F01N 3/208* (2013.01); *F01N 9/00* (2013.01); *F01N 2610/10* (2013.01);
(Continued)

(58) Field of Classification Search
CPC .... F01N 3/208; F01N 9/00; F01N 2610/1486; F01N 2610/10; F01N 2610/1453;
(Continued)

(56) References Cited

U.S. PATENT DOCUMENTS 2,760,050 A    8/1956    Porsche
7,805,930 B2    10/2010    Satou et al.
(Continued)

FOREIGN PATENT DOCUMENTS

CN    101052790 A    10/2007
CN    102312708 A    1/2012
(Continued)

OTHER PUBLICATIONS

International Search Report dated Jan. 17, 2019, from corresponding PCT application No. PCT/FR2018/052200.
(Continued)

*Primary Examiner* — Brandon D Lee
(74) *Attorney, Agent, or Firm* — Nixon & Vanderhye

(57) ABSTRACT

Disclosed is a method for preventing a risk of freezing in a device for supplying reducing agent to a selective catalytic reduction system in an exhaust line, a freezing temperature specific to the agent being stored in memory, the system including a controller operating the system and emitting pulses to an injector, the controller being inactive when the engine is switched off. With the combustion engine switched off, the controller is woken up at predetermined intervals to initiate an emission of a specific electric pulse to the injector with measurements of a current-strength and voltage of the electric pulse providing a value of the electrical resistance of
(Continued)

the injector. A temperature of the reducing agent at the injector is estimated as a function of the measured resistance and, when at least the temperature thus estimated is below the freezing temperature, a purge of the device is initiated.

20 Claims, 1 Drawing Sheet

(52) U.S. Cl.
CPC ............... *F01N 2610/1453* (2013.01); *F01N 2610/1486* (2013.01); *F01N 2900/08* (2013.01); *F01N 2900/12* (2013.01); *F01N 2900/1811* (2013.01); *F01N 2900/1821* (2013.01)

(58) Field of Classification Search
CPC ............ F01N 2900/08; F01N 2900/12; F01N 2900/1811; F01N 2900/1821; F01N 2560/06; F01N 2560/12; F01N 2610/02; F01N 2610/146; F01N 2610/148; F01N 2610/1493; F01N 11/00; F01N 3/2066; Y02A 50/20; Y02T 10/40; Y02T 10/12
See application file for complete search history.

(56) References Cited

U.S. PATENT DOCUMENTS

| | | | |
|---|---|---|---|
| 8,375,702 B2 | 2/2013 | Nishimura et al. | |
| 8,495,868 B2 | 7/2013 | McCoy et al. | |
| 9,175,619 B2 | 11/2015 | Whitehead et al. | |
| 9,188,043 B1 | 11/2015 | Faied et al. | |
| 9,359,928 B2 | 6/2016 | Fan et al. | |
| 9,605,574 B2 | 3/2017 | Nihongi et al. | |
| 9,797,288 B2 | 10/2017 | Darr et al. | |
| 10,260,393 B2 | 4/2019 | Tsukamoto et al. | |
| 2006/0021326 A1 | 2/2006 | Midlam-Mohler | |
| 2012/0036838 A1* | 2/2012 | Furuya | F01N 3/208 60/285 |
| 2015/0033712 A1 | 2/2015 | Kruse et al. | |
| 2015/0034167 A1* | 2/2015 | David | F01N 3/2046 137/3 |
| 2015/0075136 A1* | 3/2015 | Fan | F01N 3/227 60/274 |
| 2018/0087425 A1* | 3/2018 | Carr | F04C 2/084 |

FOREIGN PATENT DOCUMENTS

| | | |
|---|---|---|
| CN | 102812216 A | 12/2012 |
| CN | 104279061 A | 1/2015 |
| CN | 104755714 A | 7/2015 |
| CN | 105026711 A | 11/2015 |
| CN | 106194712 A | 12/2016 |
| CN | 106460607 A | 2/2017 |
| CN | 107091139 A | 8/2017 |
| DE | 102012216611 A1 | 4/2014 |
| EP | 2 166 208 A1 | 3/2010 |
| JP | 2007-270634 A | 10/2007 |
| WO | 03/033111 A2 | 4/2003 |
| WO | 2013156475 A1 | 10/2013 |

OTHER PUBLICATIONS

Office Action issued for CN Patent Application No. 201880072899.4 dated Jun. 3, 2021.

Wang et al., "Key Technologies of Selective Catalytic Reduction (SCR) System for Marine Diesel Engine", Ship Engineering, May 2017, vol. 39, Supplement 1, pp. 260-262.

* cited by examiner

METHOD FOR PREVENTING A RISK OF FREEZING IN A REDUCING-AGENT FEEDING DEVICE OF A SELECTIVE CATALYTIC REDUCTION SYSTEM

BACKGROUND OF THE INVENTION

Field of the Invention

The present invention relates to a method for preventing a risk of freezing in a device for supplying reducing agent to a selective catalytic reduction system in an exhaust line of a motor vehicle combustion engine, the removal of nitrogen oxides being carried out using selective catalytic reduction by injecting a quantity of reducing agent into the line.

Description of the Related Art

More than 95% of diesel engines will be equipped with a device for treating nitrogen oxides in the exhaust line. This could apply in the very near future to gasoline fueled engines.

In order to do this, in motor vehicles, in particular with a diesel engine, it is known practice to equip an internal combustion engine exhaust line with a selective catalytic reduction system having injection of reducing agent into the line, the monitoring-control unit receiving the estimates or measurements of quantities of nitrogen oxides exiting through the exhaust line at least downstream of the selective catalytic reduction system.

For the removal of nitrogen oxides or NOx, a selective catalytic reduction (SCR) system is therefore frequently used. Hereinafter in the present application, the selective catalytic reduction system could also be referred to by its abbreviation SCR, just as the nitrogen oxides could be referred to by their abbreviation NOx and ammonia by its chemical formula NH3.

In an SCR system, use is made of a liquid reducing agent intended to be introduced in predefined quantities and by consecutive injections into an exhaust line of a motor vehicle by a reducing-agent supply device that forms part of the SCR system. The addition of this pollutant-removing reducing agent treats the NOx present in the exhaust line of the combustion engine of the motor vehicle. This SCR reducing agent is frequently ammonia or an ammonia precursor, for example urea or a urea derivative, in particular a mixture known by the brand name Adblue®.

An SCR system typically has a tank containing a quantity of liquid reducing agent, a pump for supplying liquid reducing agent to an exhaust line of a motor vehicle using an injector that opens into the exhaust line. The liquid reducing agent decomposes into gaseous ammonia, of chemical formula NH3. The NH3 is stored in an SCR catalyst in order to reduce the NOx that are in the gases discharged by the exhaust line. This applies both to diesel vehicles and to gasoline vehicles.

A solution of reducing agent may freeze at a temperature approximately below −11° C. As a result, the system is purged each time the vehicle stops in order to avoid damaging the components of the SCR system as a result of the larger volume occupied by the frozen aqueous solution.

Because of this purge and because of the resultant refilling for each driving cycle, a large quantity of urea needs to be pumped and reinjected, and this creates wearing of the pump and consumes electrical energy.

Additionally, the purge causes noise after the combustion engine has stopped, which is audible in the external environment of the vehicle, and it is also appropriate to reduce this noise.

Document WO-A-2013/156475 relates to a method and a system making it possible to trigger the device that purges the injector of a selective catalytic reduction system by means of a switch that does not draw current, for example of the bimetallic strip type, which by completing the wake-up circuit of a controller of the system below a determined temperature wakes up the controller to activate the purge. This document therefore describes a purge device which seeks to perform a purge operation only if need be when a risk of the reducing agent freezing is present, thereby avoiding needless systematic purges.

However, the technology according to the prior art of a switch that draws no current does present the following disadvantages. The first disadvantage is a limit on the diagnosis of freezing by the processor of the controller. Specifically, as long as the bimetallic strip has not closed below a low temperature, it is not possible for the processor to diagnose possible freezing.

The second disadvantage is that it is impossible to modify the threshold at which the awakening of the controller is triggered by calibrating or reprogramming the bimetallic strip. A third disadvantage is that the constant presence of the bimetallic strip in combination with the supply of power to the controller may present a risk of unwanted triggering of the controller, which then places unnecessary demands on the battery. A fourth disadvantage is that the device requires at least one additional relay in order to definitively cut off the electrical power supply to the controller after the system has been purged at a temperature close to the temperature at which the reducing agent freezes. Finally, because the injector is positioned on the exhaust line some distance away from a pumping module, it may freeze well before the pumping module usually positioned inside the tank and enjoying greater thermal inertia.

Therefore, in order to avoid these disadvantages, the problem underlying the present invention is, for a selective catalytic reduction system with injection of a reducing agent into an exhaust line of a combustion engine of a motor vehicle, to avoid systematic purges of the circuit that injects reducing agent into the exhaust line each time the combustion engine stops, while at the same time effectively protecting the injection circuit and notably the injector against possible freezing of the reducing agent.

SUMMARY OF THE INVENTION

To this end, the present invention relates to a method for preventing a risk of freezing in a device for supplying reducing agent to a selective catalytic reduction system in an exhaust line of a motor vehicle combustion engine, a threshold temperature below which there is a risk of the reducing agent freezing being stored in memory, the catalytic reduction system comprising a controller in charge of the operation of the system and emitting pulses to an injector of reducing agent into the system, the controller being inactive when the engine is switched off, characterized in that, with the combustion engine switched off, the controller is woken up at predetermined and calibratable intervals to initiate an emission of a specific electric pulse to the reducing-agent injector with measurements of a current-strength and voltage of the electric pulse providing a value of the electrical resistance of the injector, and a temperature of the reducing agent at the injector is estimated as a function of the measured resistance and, when at least the temperature estimated at the injector is below the stored reducing-agent freezing temperature, a purge of reducing agent from the device for supplying the system with reducing agent is initiated.

The technical effect of the present invention is that the device for supplying the reduction system is not systematically purged when the engine is stopped, which purge could prove not to be necessary and costs energy, when purging and when refilling the system at the next starting of the vehicle. This is obtained by monitoring the temperature of the reducing agent at determined intervals in order to check whether this temperature is above the freezing temperature of the reducing agent, and that there is therefore no risk of the reducing agent freezing and damaging the system, and notably its injector, through an increase in volume.

This is done in a simple and precise way, by recording the electrical resistance at the injector and by deducing the temperature from a preestablished correlation between temperature and resistance.

In the nearest prior art, the controller is not woken up periodically to check for possible freezing of the reducing agent, but is woken up only by the bimetallic strip when the latter has reached a certain temperature indicative of freezing of the reducing agent, which is an on/off system. There is therefore no monitoring of the cooling of the reducing agent as there is in the present invention.

This possibility makes it possible more easily to anticipate a risk of freezing with, for example, a change to the intervals between two awakenings of the controller which intervals can be recalibrated, advantageously decreased as the risk of freezing increases. Furthermore, monitoring the resistance by way of a parameter connected with the temperature is a solution that does not involve the incorporation of an auxiliary element such as a bimetallic strip.

Advantageously, the specific pulse to the injector is an injector control pulse that is weak enough that it does not cause the injector to open. In order to check the temperature at the injector, there is no need to open the injector, which opening would cause a needless loss of reducing agent. A control pulse just enough to measure an electrical resistance value in the injector and, by the same token, a temperature at the injector, is optimal.

Advantageously, at least one parameter additional to the estimated temperature in the injector is taken into consideration to confirm the initiation of the purge, said at least one parameter being considered individually or in combination from among the following parameters: an outside temperature below a predetermined outside temperature, a weather forecast regarding an outside temperature that may be reached in a determined forthcoming time, a temperature in a reducing-agent tank upstream of the injector and, in the case of an injector that is cooled by the engine cooling circuit, a combustion engine coolant temperature.

The temperature of the reducing agent, just like the temperature of the coolant, will reflect the outside temperature, with a greater or lesser degree of thermal inertia. Likewise, just after the engine stops, the relatively high temperature of the coolant will slow the drop in temperature of the reducing agent caused by a cold outside temperature.

Advantageously, a model of the cooling of the system, indicative of the thermal inertia of the system and that takes account of a currently-prevailing outside temperature, is formulated and, when the temperature measured at the injector is higher than the freezing temperature of the reducing agent but the model anticipates that a temperature measured at the injector will become lower than the freezing temperature of the reducing agent in a calibratable predetermined forthcoming period of time, a preventative purge of the device supplying reducing agent to the system is initiated.

It is highly advantageous to anticipate a drop in outside temperature so as to provide the best protection against freezing. This makes it possible for example to lengthen the intervals separating a waking-up of the controller while at the same time increasing the protection against potential freezing of the reducing agent in the injector. The model may take account of the cooling of the engine, of the thermal inertia of the assembly comprising the engine and the exhaust line with its auxiliary elements such as the reduction system, and of the drop in outside temperature that occurs for example during the night time, so as to anticipate a temperature in the injector. It is appropriate that freezing of reducing agent should not occur while the controller is switched off between two awakenings: this is why the formulation of a temperature model is desirable.

Advantageously, the predetermined forthcoming period of time is calibrated to be shorter than a predetermined interval between two awakenings of the controller. That makes it possible to avoid the reducing agent freezing between two awakenings and switch-offs of the controller. A predetermined forthcoming interval longer than an interval between two awakenings of the controller would not be desirable for initiating a preventative purge, because it is preferable to await the latest awakening of the controller in order to purge or not purge.

Advantageously, after a purge, the prevention method is suspended and awakenings of the controller at predetermined intervals are no longer performed. There is therefore no longer any risk of the reducing agent freezing and there is no longer any need to place demands on the electrical power supply means of the controller, which is the vehicle battery.

Advantageously, the intervals can be calibrated as a function of the outside temperature, the intervals being shorter, the lower the outside temperature. This makes it possible to avoid the reducing agent freezing between two awakenings and switch-offs of the controller, this being something that could happen when the outside temperature drops sharply.

Advantageously, after the combustion engine has been stopped, the device for supplying the system with reducing agent is depressurized. This is a safety precaution for the reduction system.

The present invention relates to an assembly comprising a motor vehicle exhaust line and a selective catalytic reduction system, with a reducing-agent supply device comprising an injector of reducing agent into the exhaust line from a tank of reducing agent, the assembly implementing such a method, the selective catalytic reduction system comprising a controller in charge of the operation of the system and comprising an injection driver emitting pulses to the injector of reducing agent into the system, the controller having means for activating a purge of the reduction system supply device and being inactive when the engine is switched off, characterized in that the assembly comprises a wake-up device equipped with a time counter and with means for waking up the controller at predetermined intervals, the controller having means for controlling the injection driver so that upon its awakening it sends a pulse to the injector and comprising means for measuring the voltage and the current-strength of the pulse, means for calculating the resistance of the injector from the measured voltage and measured current-strength, means for storing in memory a map that maps the resistance of the injector as a function of its temperature in order to estimate the temperature of the injector, and means for comparing the estimated temperature of the injector against the threshold temperature stored in memory below which there is a risk of the reducing agent freezing, the means for activating a purge being operational when the estimated temperature at the injector is below the freezing temperature.

Advantageously, the injection driver commands the opening and closing of the injector according to a duty factor associated with an injection control frequency, the duty factor varying from 0 to 100%, and a validation command switching directly from 0 to 100%, the injection driver, upon the awakening of the controller, sending to the injector a pulse the duty factor of which is not sufficient to open the injector.

BRIEF DESCRIPTION OF THE DRAWINGS

Other features, aims and advantages of the present invention will become apparent upon reading the detailed description that will follow and upon examining the appended drawings, given by way of non-limiting examples and in which.

DESCRIPTION OF THE PREFERRED EMBODIMENTS

In what follows, upstream and downstream are to be considered in the sense of a flow of exhaust gases along an exhaust line.

Figure 1:
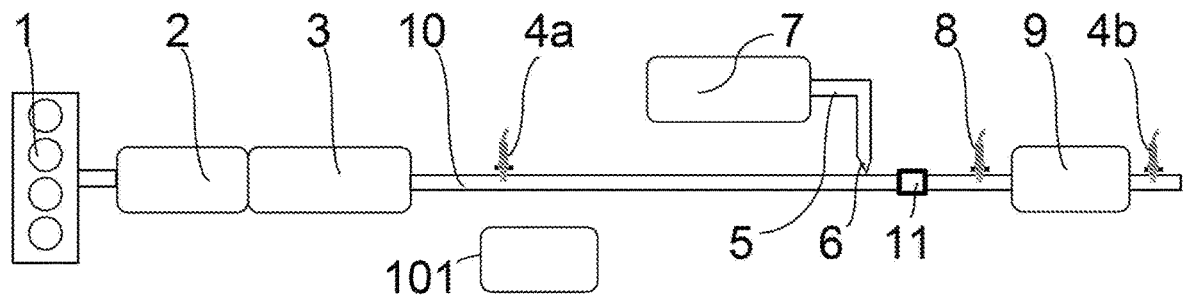
FIG. 1 shows an assembly comprising a combustion engine and an exhaust line comprising a selective catalytic reduction system with a device for injecting reducing agent into the exhaust line, it being possible for the prevention of freezing of reducing agent in the injection device to be controlled using a method according to the present invention.

Reference is made to FIG. 1 which shows a combustion engine 1 and an exhaust line 10 for removing the exhaust gases originating from combustion in the combustion engine 1. The exhaust line 10 may comprise, in the vicinity of an exhaust manifold of the engine 1, an oxidation catalytic converter 2 and a particulate filter 3, for a compression-ignition engine 1, notably a diesel engine 1 or engine running on gas oil.

In the case of a controlled-ignition combustion engine, notably an engine running on gasoline or on a mixture containing gasoline, the line 10 may comprise a three-way catalytic converter and a gasoline particulate filter.

An upstream nitrogen oxides probe 4a, also referred to as an upstream NOx probe is positioned downstream of the particulate filter 3. All the features relating to the reduction catalytic converter 2, to the particulate filter 3 and to the upstream NOx probe 4a are not essential for the implementation of the present invention.

Shown next is a device for supplying reducing agent by injecting reducing agent into the line, this supply device forming part of the selective catalytic reduction system. The injection device comprises a tank 7 of reducing agent, a pipe 5 leaving the tank 7 and opening into the exhaust line 10 via an injector 6. A pump, not illustrated in FIG. 1, may draw reducing agent from the tank 7 toward the injector 6.

As an accessory, at least one heating element may be provided in the tank 7. Likewise, a temperature sensor may be provided in the tank 7 to measure the temperature of the liquid agent that the tank 7 contains. A liquid reducing agent gauge may also advantageously be provided in the tank 7.

Optionally, and non-compulsorily, an accumulator of liquid agent for temporarily storing a dose of reducing agent, not shown in FIG. 1, may be connected to the pipe 5 by being positioned between the pump and the injector 6. The injection system may also possess a pressure sensor which measures the pressure prevailing in the pipe.

The reducing-agent supply device, notably the pipe 5 and the injector 6, may become blocked and even damaged if the reducing agent freezes. As a result, it is appropriate to purge the pipe 5 and the injector 6 of the supply device regularly. A systematic purge of the supply device is therefore performed when the vehicle stops. It is a systematic purge such as this that the present invention seeks to avoid in order to carry out a purge only when the risk of the reducing agent freezing is proven.

Downstream of the injector 6 in the exhaust line 10 is mounted a mixer 11 that mixes reducing agent with the exhaust gases, the reducing agent decomposing into ammonia.

An ammonia probe 8 is provided, this being positioned downstream of the selective catalytic reduction or SCR catalytic converter 9, remaining part of the catalytic reduction system, supplementing the device supplying reducing agent. Downstream of the SCR catalytic converter 9 there is a downstream NOx probe 4b that makes it possible to check whether all the nitrogen oxides have been reduced. The mixer 11, the downstream NOx probe 4b and the ammonia probe 8 are not essential to the implementation of the present invention, whereas the selective catalytic reduction catalytic converter 9 is, as are the tank 7, the pipe, the injector 6 and the controller 101 of the system which is not depicted in FIG. 1.

Figure 2:
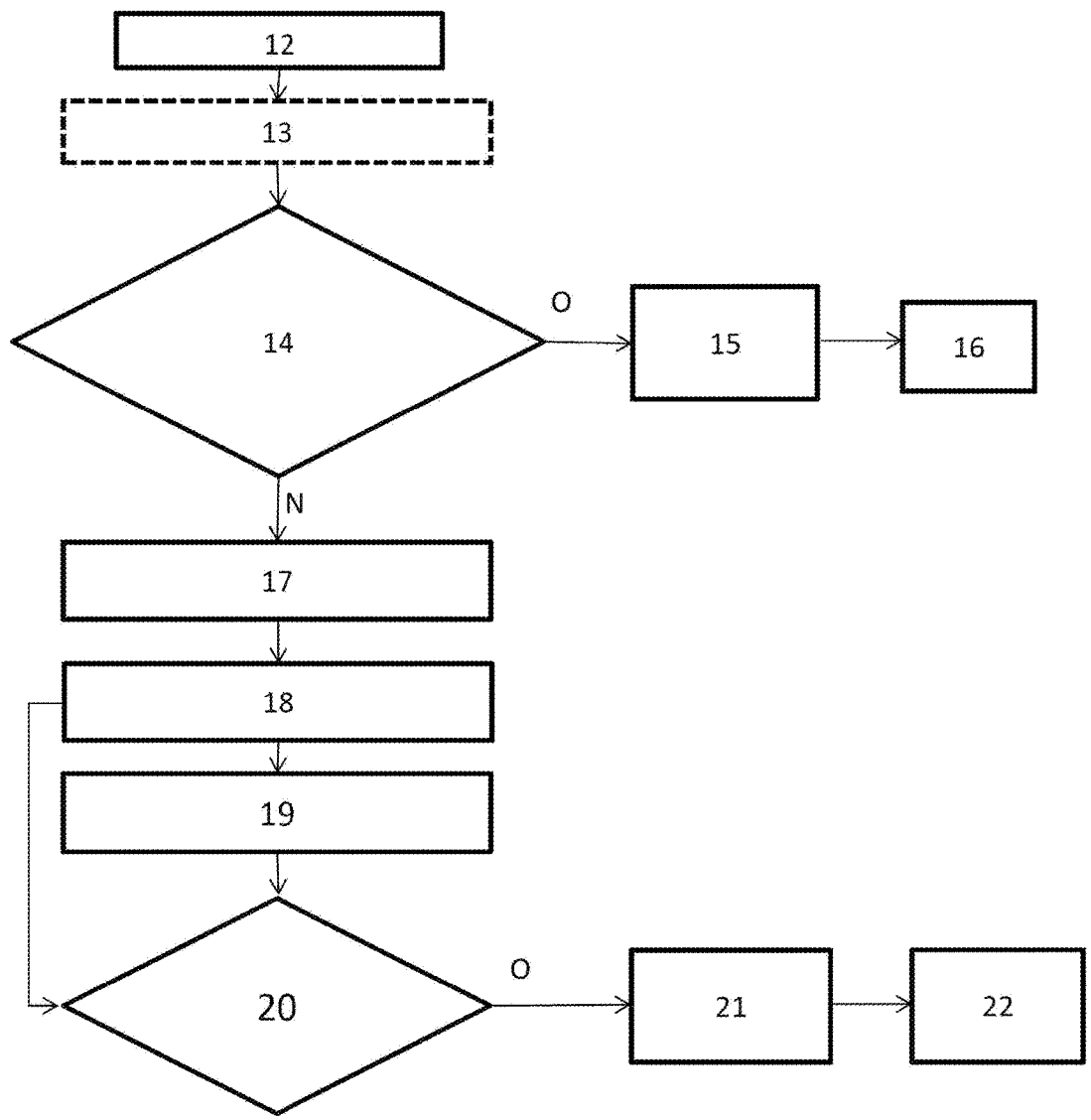
FIG. 2 illustrates a logic diagram according to one embodiment of the method for preventing the risk of freezing in a device supplying reducing agent to a selective catalytic reduction system in an exhaust line of a motor vehicle combustion engine according to the present invention.

With reference to FIG. 2, while considering FIG. 1 for the references not present in FIG. 2, the present invention relates to a method for preventing the risk of freezing in a device supplying reducing agent to a selective catalytic reduction system in an exhaust line 10 of a motor vehicle combustion engine 1. The catalytic reduction system comprises a controller 101 in charge of the operation of the system and emitting pulses to an injector 6 of reducing agent of the system supply device, the controller 101 being inactive when the engine 1 is switched off. The controller in charge of the operation of the system stores in memory beforehand a threshold temperature below which there is a risk of the reducing agent freezing.

In what follows, the method for preventing a risk of the reducing agent freezing will be described with reference to FIG. 2. However, FIG. 2 illustrates certain steps in the method which are purely optional and are not essential to the implementation of the method, these steps being mentioned hereinafter as being optional.

When the engine 1 is switched off, which is what is illustrated by the reference 12, and after the system has been at least partially depressurized, something which is optional and illustrated by the reference 13, a first question step referenced 14 may optionally be carried out.

This first question step 14 relates to the following three conditions with, if at least one of the three conditions is present, a response yes O to the first question 14. If an ambient outside temperature is below a minimum ambient outside temperature, if a temperature of the tank 7 of reducing agent is below a minimum tank 7 temperature or if a battery voltage is below a minimum voltage, the response to the first question 14 is yes O and a preventative purge, referenced 15, of the SCR system supply device is carried out and then the controller 101 in charge, having been kept awake until just after the vehicle stops in order to carry out this optional first question step 14, is put to sleep. Following the purge, the controller 101 is returned to standby 16 and the method according to the present invention is suspended.

For this optional first question step 14, the controller 101 in charge of the system comprises means for storing in memory a minimum outside temperature and a minimum tank 7 temperature, at least one of which temperatures could more or less rapidly lead to freezing of the reducing agent. The decision is then taken to purge the SCR system supply device, this purge being almost certain to be necessary while the engine 1 is stopped and the temperature of the reducing agent is gradually dropping.

There is then no further need to implement the rest of the prevention method according to the invention. The values of the outside temperature and of the temperature of the reducing-agent tank 7 may be communicated directly or indirectly by sensors to the controller 101 in charge of the system. Indirectly means that these values are processed by another control unit other than the controller 101 and then transmitted to the controller 101, it being possible for the other control unit to be a monitoring-control unit of the vehicle.

The condition regarding the battery voltage serves to avoid a potential purge, that is to occur while the vehicle is stopped, being prevented by too low a battery voltage. In this case, it is preferable for the purge to be performed just after the vehicle stops, so that this purge is achieved.

If the response to the optional first question 14 is no N, no purge is carried out just after this first question 14 and the method for preventing a risk of the reducing agent freezing is implemented.

At reference 17, the controller 101 in charge of the system is placed on standby. However, as referenced by 18, the controller 101 is woken up at predetermined and calibratable intervals. This serves to initiate an emission of a specific electrical pulse to the injector 6 of reducing agent with measurements 19 of a current-strength and voltage of the electrical pulse, providing a value for the electrical resistance of the injector 6. This taking of measurements of the current-strength, voltage and value of the electrical resistance of the injector 6 is referenced 19.

This value of electrical resistance is used to determine the temperature of the injector 6, the electrical resistance of the injector 6 being a function of the temperature and the temperature of the reducing agent at the injector 6 being able to be deduced from a temperature of the injector 6 estimated from the electrical resistance of the injector 6. An estimate of a temperature of reducing agent at the injector 6 as a function of the measured resistance is then made.

A second question step 20 is then performed. The essential question in this second question step 20 is: "is the estimated temperature at the injector 6 below or equal to a threshold temperature stored in the controller 101 below which there is a risk of the reducing agent freezing?".

If the response to this second question 20 is yes O, namely when at least the estimated temperature at the injector 6 is below the stored freezing temperature of the reducing agent, a purge of the SCR system supply device is initiated, this being illustrated by the reference 21. The controller 101 is then placed on standby and is no longer woken up at determined intervals, this being referenced 22 in FIG. 2. The prevention method is then suspended.

Other optional conditions may form the subject of this second question step 20. For example, if the temperature of the reducing-agent tank 7 is below a minimum tank 7 temperature, if a battery voltage is below a minimum voltage or if an interval between two awakenings 18 is longer than a maximum interval, an optional response to the second question step 20 may be yes O and the SCR system supply device is purged, this being illustrated by the reference 21. The controller 101 is then placed on standby and no longer woken up 18 at determined intervals, this being referenced 22 in FIG. 2.

The interval between two awakenings 18 being longer than a maximum interval is indicative of a malfunctioning of the way in which the controller 101 is woken up 18. As a preventive measure, a purge may be performed, because the validity of the freezing diagnosis of the method may be compromised.

For measuring the electrical resistance of the injector 6, the specific pulse to the injector 6 may be an injector 6 control pulse that is weak enough that it does not cause the injector 6 to open, such opening of the injector presenting no advantage and giving rise to disadvantages such as a needless flow of reducing agent, and noise.

Additional parameters for confirming purge, in addition to the estimated temperature in the injector 6, estimated by measuring the electrical resistance of the injector 6 during a pulse of current, were mentioned in the first question step 14. In addition to the outside temperature being below a predetermined outside temperature or to the temperature in a reducing-agent tank 7 upstream of the injector 6, consideration may be given to a weather forecast regarding an outside temperature that may be reached in a determined forthcoming time, and a temperature of a combustion engine 1 coolant, which is also indicative of the temperature of the injector 6, this being in the case of an injector that is cooled by the engine cooling circuit.

Graphs may estimate a drop in temperature in the injector 6 as a function of these parameters. Thus, a model of the cooling of the SCR system supply device, indicative of the thermal inertia of the device and of the surrounding elements, may be formulated.

This model may take account of a currently-prevailing outside temperature and, when the temperature measured at the injector 6 is higher than the freezing temperature of the reducing agent but the model anticipates that a temperature measured at the injector 6 will become lower than the freezing temperature of the reducing agent in a calibratable predetermined forthcoming period of time, a preventative purge of the device supplying reducing agent to the system is initiated.

For example, in the case of a reducing-agent temperature, estimated from a measurement of the electrical resistance of the injector 6, that is higher than the freezing temperature, when the model nevertheless detects a risk of freezing before a further forthcoming standby interval has ended and the awakening of the controller 101 has come into effect, a preventative purge may be initiated during the current standby of the controller 101. The predetermined forthcoming period of time can therefore be calibrated to be shorter than a predetermined interval between two awakenings 18 of the controller 101.

The intervals may be able to be calibrated as a function of an outside temperature or of the model. The intervals may be shorter the lower the outside temperature, so as to guarantee the best protection of the reducing agent against freezing that may occur between the controller 101 being placed on standby at the start of a standby interval and the awakening 18 of the controller 101 at the end of the interval.

With reference mainly to FIG. 1, the present invention also relates to an assembly comprising a motor vehicle exhaust line 10 and a selective catalytic reduction system with a reducing-agent supply device comprising an injector 6 of reducing agent into the exhaust line 10 from a tank 7 of reducing agent. The selective catalytic reduction system comprises a controller 101 in charge of the operation of the system and an injection driver emitting pulses to the injector 6 of reducing agent into the system. The controller 101 is equipped with means for activating a purge of the reduction system supply device and is inactive when the engine 1 is switched off.

The assembly comprises a wake-up device equipped with a time counter and with means 18 for awakening the controller 101 at predetermined intervals. The controller 101 has means for controlling the injection driver so as upon its awakening 18 to send a pulse to the injector 6 and comprises or is connected to means for measuring the voltage and the current-strength of the pulse.

The controller 101 comprises means for calculating the resistance of the injector 6 from the measured voltage and the measured current strength, means for storing in memory a map mapping the resistance of the injector 6 as a function of its temperature for an estimation of the temperature of the injector 6 and means for comparing the estimated temperature of the injector 6 against a threshold temperature stored in memory and below which there is a risk of the reducing agent freezing.

The means for activating a purge of the SCR system supply device are operational when the estimated temperature at the injector 6 is below the threshold temperature.

The injection driver, for controlling the injection of reducing agent into the exhaust line 10, provides the commands to open and close the injector 6 by means of a duty factor associated with an injection control frequency, the duty factor varying from 0 to 100% and a validation command switching directly from 0 to 100%. This is a conventional approach for injecting reducing agent.

By using this command but not injecting reducing agent into the line 10 from the injector 6, the injection driver can, on the awakening 18 of the controller 101, send to the injector 6 a pulse of which the duty factor is not sufficient to open the injector 6 but is sufficient to make a reliable measurement of the electrical resistance of the injector 6 as a function of the current and of the voltage that are detected at the terminals of the injector 6.

The invention claimed is:

1. A method for preventing freezing in a device for supplying a reducing agent to a selective catalytic reduction system in an exhaust line (10) of a motor vehicle combustion engine (1), wherein a threshold temperature, corresponding to a temperature below which there is a risk of the reducing agent freezing, is stored in a non-transitory memory, the catalytic reduction system comprising a controller that operates the system and emits pulses to an injector (6) that injects the reducing agent into the system, the method comprising:
   with the combustion engine (1) switched off, waking the controller from an inactive state at predetermined and calibratable intervals;
   initiating, via the controller, an emission of an electric pulse to the injector (6);
   measuring, via the controller, a current-strength and a voltage of the electric pulse to determine a value of the electrical resistance of the injector (6);
   estimating, via the controller, a temperature of the reducing agent at the injector (6) as a function of the resistance determined from the measured current-strength and voltage; and
   causing, via the controller, the reducing agent to be purged from the device for supplying the reducing agent when the estimated temperature of the reducing agent at the injector (6) is below the stored threshold temperature.

2. The method as claimed in claim 1, wherein the electric pulse is an injector (6) control pulse that does not cause the injector (6) to open.

3. The method as claimed in claim 1, wherein the controller takes into consideration at least one parameter additional to the estimated temperature before causing the reducing agent to be purged, said at least one parameter selected from the group consisting of: an outside temperature below a predetermined outside temperature, a weather forecast regarding an outside temperature that may be reached in a determined forthcoming time, a temperature in a reducing-agent tank (7) upstream of the injector (6) and, in the case of an injector that is cooled by the engine cooling circuit, a combustion engine (1) coolant temperature.

4. The method as claimed in claim 1, further comprising:
   formulating a model of a cooling of the system indicative of a thermal inertia of the system and that takes account of a currently-prevailing outside temperature; and
   when the estimated temperature is higher than a freezing temperature of the reducing agent and the model anticipates that a temperature measured at the injector (6) will become lower than the freezing temperature of the reducing agent in a calibratable predetermined forthcoming period of time, initiating a preventative purge of the device supplying reducing agent to the system.

5. The method as claimed in claim 4, wherein the predetermined forthcoming period of time is calibrated to be shorter than a predetermined interval between two awakenings (18) of the controller.

6. The method as claimed in claim 1, further comprising:
   after said causing the reducing agent to be purged, suspending the controller from being awakened.

7. The method as claimed in claim 1, wherein the intervals are calibrated as a function of the outside temperature such that the intervals become shorter with lower outside temperature.

8. The method as claimed in claim 1, further comprising:
   after the combustion engine (1) has stopped, the device for supplying the system with reducing agent is depressurized (13).

9. The method as claimed in claim 2, wherein the controller takes into consideration at least one parameter additional to the estimated temperature before causing the reducing agent to be purged, said at least one parameter selected from the group consisting of: an outside temperature below a predetermined outside temperature, a weather forecast regarding an outside temperature that may be reached in a determined forthcoming time, a temperature in a reducing-agent tank (7) upstream of the injector (6) and, in the case of an injector that is cooled by the engine cooling circuit, a combustion engine (1) coolant temperature.

10. The method as claimed in claim 2, further comprising:
    formulating a model of a cooling of the system indicative of a thermal inertia of the system and that takes account of a currently-prevailing outside temperature; and
    when the estimated temperature is higher than a freezing temperature of the reducing agent and the model anticipates that a temperature measured at the injector (6)

will become lower than the freezing temperature of the reducing agent in a calibratable predetermined forthcoming period of time, initiating a preventative purge of the device supplying reducing agent to the system.

11. The method as claimed in claim 3, further comprising:
formulating a model of a cooling of the system indicative of a thermal inertia of the system and that takes account of a currently-prevailing outside temperature; and
when the estimated temperature is higher than a freezing temperature of the reducing agent and the model anticipates that a temperature measured at the injector (6) will become lower than the freezing temperature of the reducing agent in a calibratable predetermined forthcoming period of time, initiating a preventative purge of the device supplying reducing agent to the system.

12. The method as claimed in claim 2, of further comprising:
after said causing the reducing agent to be purged, suspending the controller from being awakened.

13. The method as claimed in claim 3, further comprising:
after said causing the reducing agent to be purged, suspending the controller from being awakened.

14. The method as claimed in claim 4, further comprising:
after said causing the reducing agent to be purged, suspending the controller from being awakened.

15. The method as claimed in claim 5, further comprising:
after said causing the reducing agent to be purged, suspending the controller from being awakened.

16. The method as claimed in claim 2, wherein the intervals are calibrated as a function of the outside temperature such that the intervals become shorter with lower the outside temperature.

17. The method as claimed in claim 3, wherein the intervals are calibrated as a function of the outside temperature such that the intervals become shorter with lower outside temperature.

18. The method as claimed in claim 4, wherein the intervals are calibrated as a function of the outside temperature such that the intervals become shorter, the with lower outside temperature.

19. An assembly, comprising:
an exhaust line (10) for an engine (1) of a motor vehicle; and
a selective catalytic reduction system that includes a reducing-agent supply device equipped with an injector (6) that injects reducing agent into the exhaust line (10) from a tank (7) of reducing agent,
the selective catalytic reduction system comprising a controller that controls an operation of the selective catalytic reduction system, the controller configured to emit pulses to the injector (6),
the controller configured to activate a purge of the reducing-agent supply device and being inactive when the engine (1) is switched off,
the controller configured to awake from a suspended state at predetermined intervals,
wherein the controller is configured so that upon awakening (18) of the controller, the controller sends a pulse to the injector (6), measures a voltage and a current-strength of the pulse, calculates a resistance of the injector (6) from the measured voltage and the measured current-strength, stores a map in a non-transitory memory that maps the resistance of the injector (6) as a function of temperature in order to estimate a temperature of the injector (6), compares the estimated temperature of the injector (6) against a stored threshold temperature that is a temperature below which there is a risk of the reducing agent freezing, and activates the purge of the reducing-agent supply device when the estimated temperature at the injector (6) is determined by the controller to be below the stored threshold temperature.

20. The assembly as claimed in claim 19,
wherein the controller causes an opening and closing of the injector (6) according to a duty factor associated with an injection control frequency, the duty factor varying from 0 to 100%, and a validation command switching directly from 0 to 100%, and
wherein the pulse sent to the injector upon the awakening of the controller has a duty factor that of which is not sufficient to open the injector (6).

\* \* \* \* \*